United States Patent [19]

Johnston et al.

[11] Patent Number: 4,671,434

[45] Date of Patent: Jun. 9, 1987

[54] FERTILIZER SPREADER

[75] Inventors: Damon A. Johnston, Aurora; Geroge L. Garcia, Chicago, both of Ill.

[73] Assignee: Suncast Corporation, Batavia, Ill.

[21] Appl. No.: 720,615

[22] Filed: Apr. 5, 1985

[51] Int. Cl.$^4$ .............................................. A01C 17/00
[52] U.S. Cl. .................................. 222/625; 222/502; 239/685
[58] Field of Search ............ 222/625, 45, 153, 179.5, 222/471, 470, 472, 473, 609, 610, 611, 613, 619, 623–624, 502; 239/665, 689, 685, 286

[56] References Cited

U.S. PATENT DOCUMENTS

| | | | |
|---|---|---|---|
| 139,932 | 6/1873 | Sweetland | 403/298 |
| 2,661,955 | 12/1953 | Sherer | 222/502 |
| 3,187,952 | 6/1965 | Santarelli | 222/625 |
| 3,224,636 | 12/1965 | Atkinson | 222/625 |
| 3,580,426 | 5/1971 | Manning | 222/625 |
| 3,856,211 | 12/1974 | Williams | 239/685 |
| 4,106,704 | 8/1978 | McRoskey et al. | 222/625 |
| 4,121,733 | 10/1978 | McRoskey et al. | 222/625 |

*Primary Examiner*—Joseph J. Rolla
*Assistant Examiner*—Michael S. Huppert
*Attorney, Agent, or Firm*—Fitch, Even, Tabin & Flannery

[57] ABSTRACT

The present invention relates to a fertilizer spreader having a hopper for holding a granular material. A handle is connected to the hopper for manipulating the hopper. The hopper has a discharge aperture in its lower portion to allow material to discharge from the hopper. A gate is selectively positionable adjacent to the discharge aperture for controlling the rate of discharge of material through the discharge aperture. A control apparatus is connected to the gate for holding the gate in a selected position relative to the discharge aperture. A pivotal support leg is connected to the control apparatus and the hopper, so that when the support leg supports the hopper, the leg is pivoted to operate the control apparatus to position the gate in an attitude for interrupting the flow of material through the discharge aperture.

27 Claims, 23 Drawing Figures

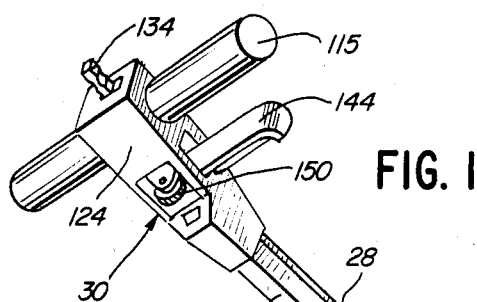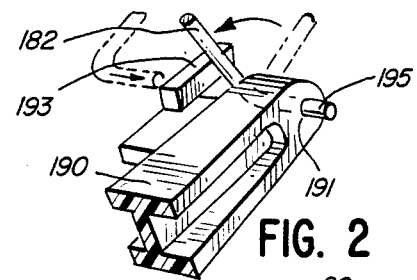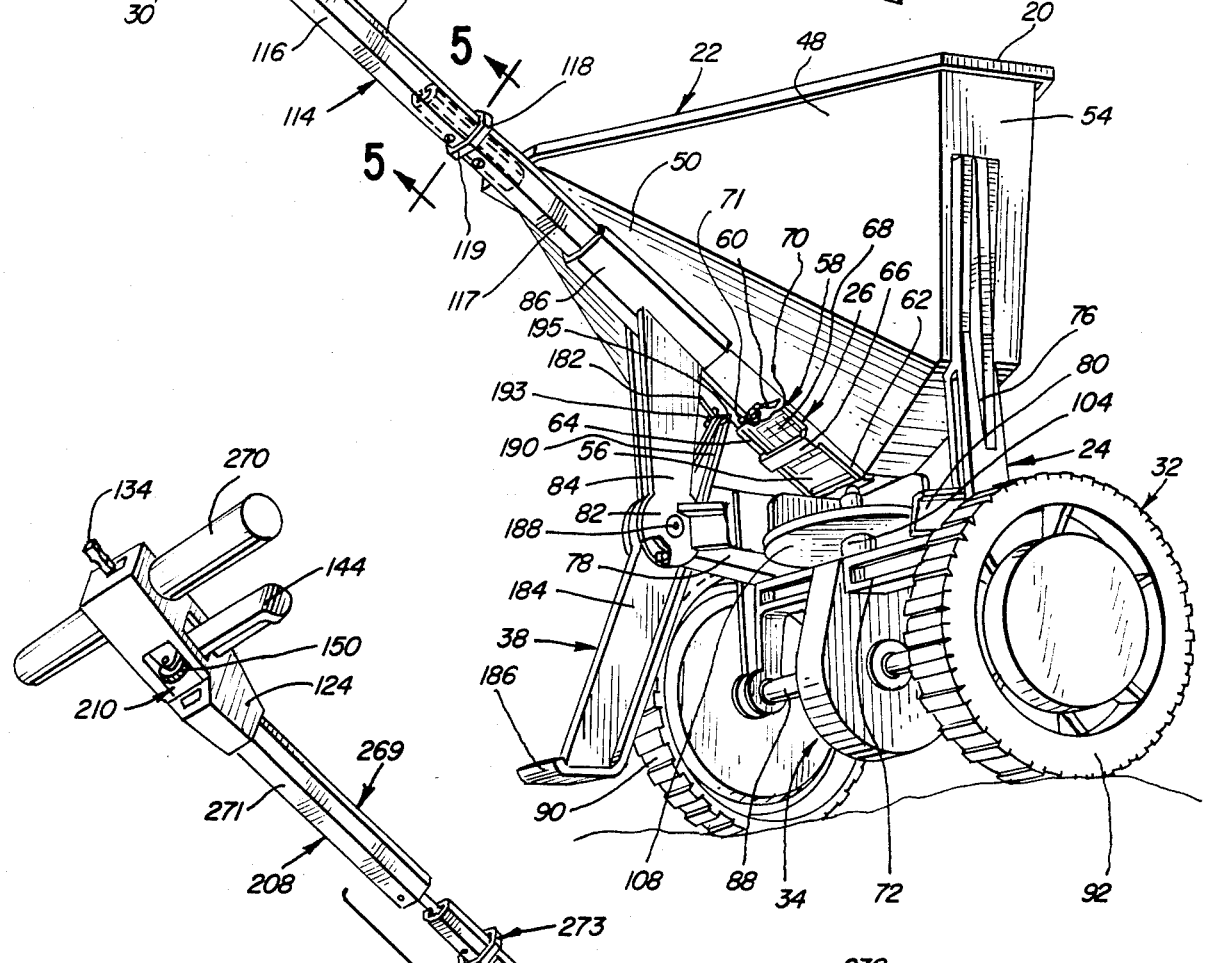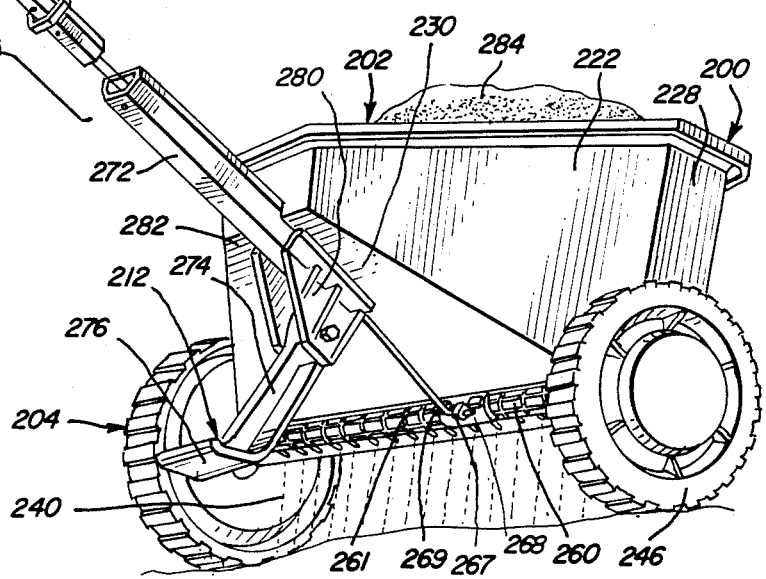
FIG. 1
FIG. 2
FIG. 3

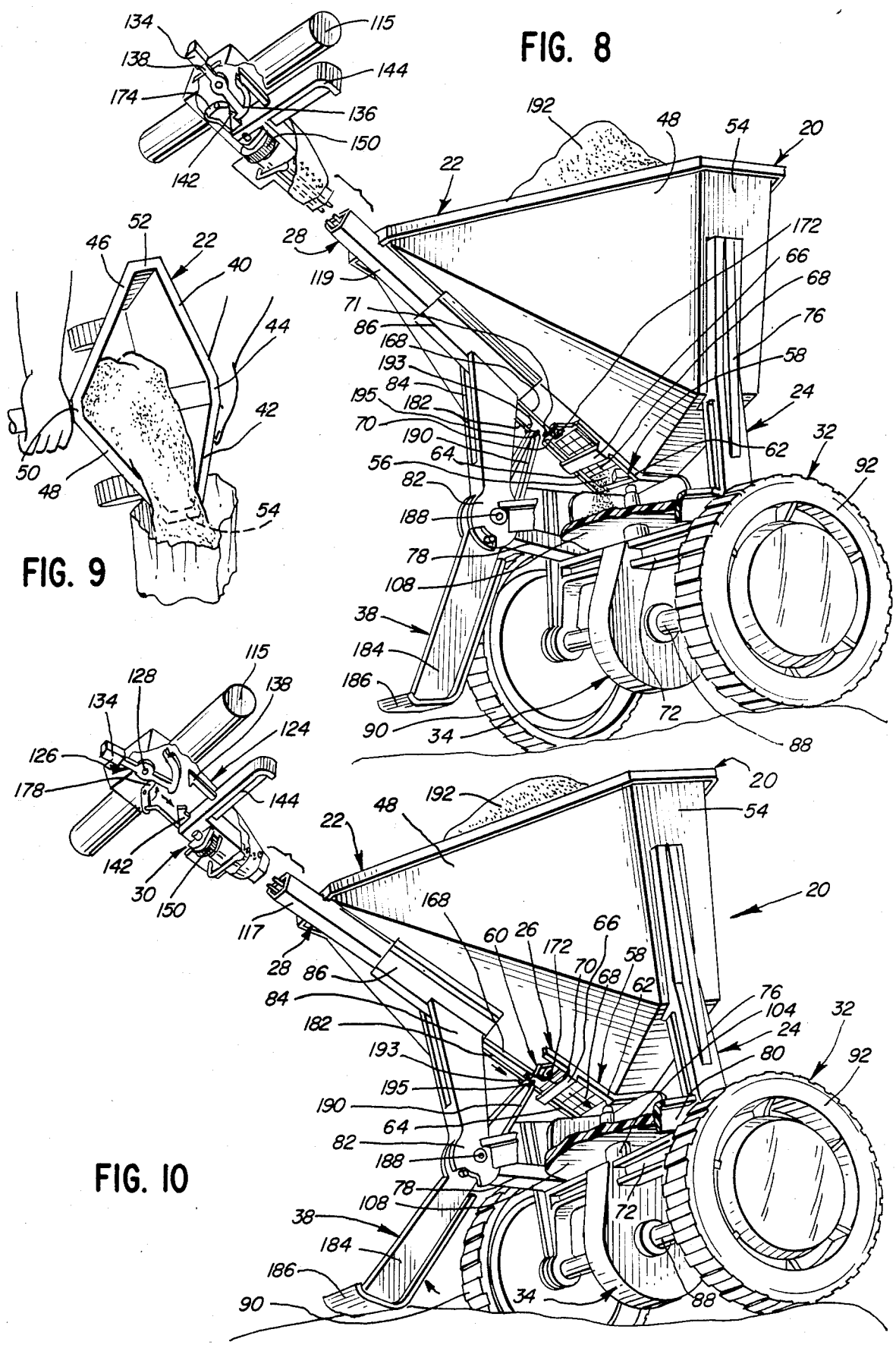

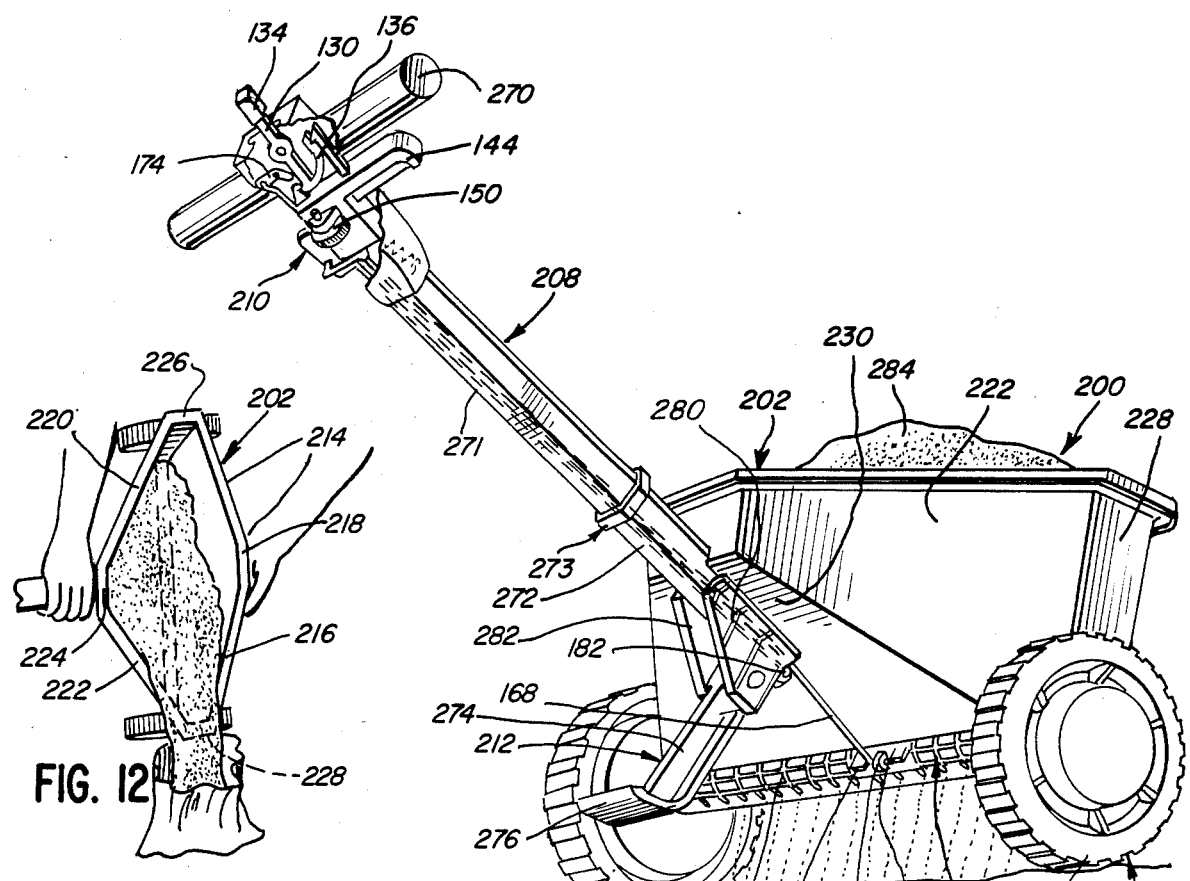
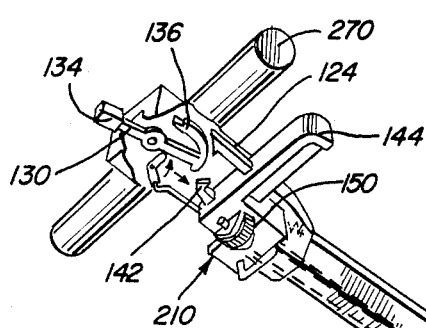
FIG. 12
FIG. 11
FIG. 13

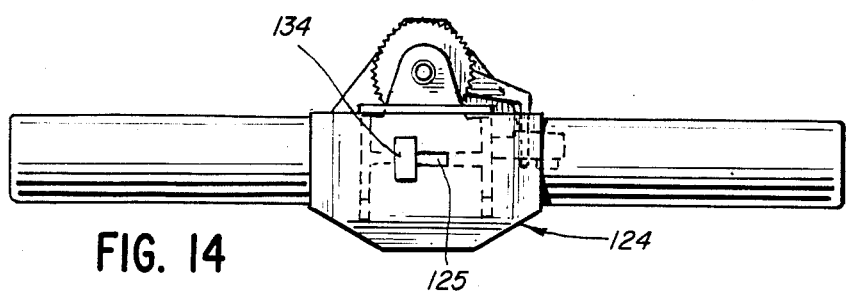
FIG. 14
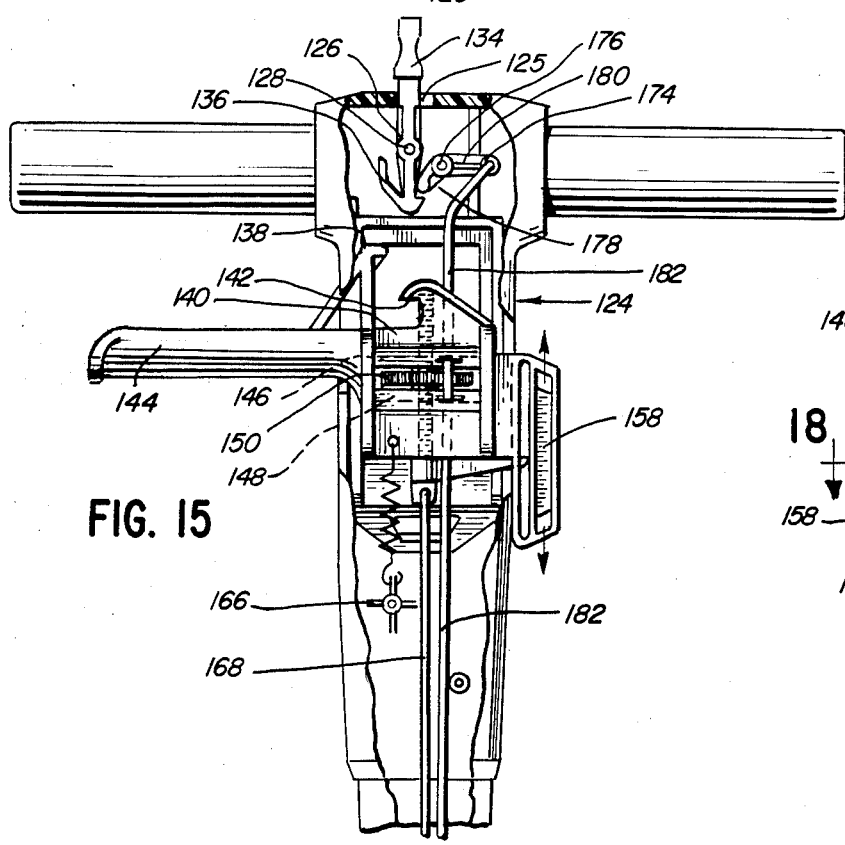
FIG. 15
FIG. 16
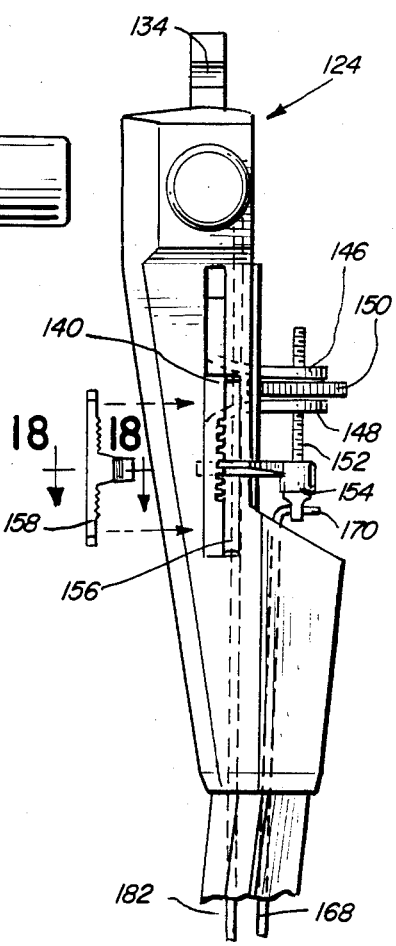
FIG. 17
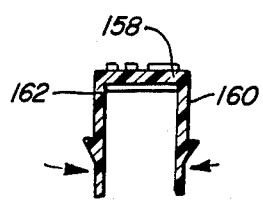
FIG. 18

FERTILIZER SPREADER

BACKGROUND OF THE INVENTION

Fertilizer spreaders, which are typically used on lawns and gardens, generally fall into two types, that is: the broadcast type, such as that which is shown in U.S. Letters Pat. No. 4,106,704, to McRoskey et al., entitled, "Spreader (Broadcast)"; and the drop type, such as that which is shown in U.S. Letters Pat. No. 4,121,733, to McRoskey et al., entitled "Spreader Having An Anticlogging Mechanism". Both the broadcast type spreader and the drop type spreader operate on the principle that a granular dry fertilizer is held in a hopper. The hopper contains an aperture so that the fertilizer falls out of the hopper through the aperture. In the case of the broadcast type spreader, the fertilizer falls onto a propeller which rotates to throw the fertilizer away from the spreader. In the drop type spreader, the fertilizer falls through a line of apertures onto the ground below the hopper. In each instance, a gate is provided to regulate the rate of discharge of fertilizer through the aperture. It is common for the position of the gate relative to the discharge aperture to be adjustable so that the rate of flow of fertilizer out of the hopper may be regulated.

It may be appreciated that when the spreader stops moving, the gravity feed from the hopper continues to allow fertilizer to fall out of the hopper. In the case of the drop type spreader, the fertilizer falls out of the holes onto the ground. In the case of the broadcast type fertilizer spreader, the fertilizer falls onto the propeller and when the quantity of fertilizer builds up, the fertilizer falls off the propeller onto the ground below the propeller. In either event, the end result is that there is fertilizer in too great a quantity on the ground. In the instance where the fertilizer is being used on a lawn, the excess fertilizer tends to burn out the lawn in the immediate area where the fertilizer was applied in excess. An operator of a fertilizer spreader may avoid the problem of having an excess amount of fertilizer being discharged by the hopper by closing the gate to interrupt the flow of fertilizer. However, all operators are not perfect. An operator may stop a spreader to move a piece of equipment, such as, a hose or sprinkler, which results in an excess of fertilizer being delivered to a given spot. It is one of the objects of the present invention to provide a fertilizer spreader which automatically shuts off the flow of fertilizer when the fertilizer spreader is set to rest.

The fertilizer, in many instances, may be found to be highly corrosive when combined with metal, so that any metal which comes in contact with the fertilizer tends to corrode if there is any water. Another object of the instant invention is to provide a fertilizer spreader construction wherein substantially all of the parts are made of plastic, which do not corrode when they contact a fertilizer.

It is found that the fertilizer in a spreader need not necessarily be completely used in fertilizing a certain area, and it is necessary to return the fertilizer to its original container. It is desirable to provide a fertilizer spreader which provides easy pouring of the fertilizer from the hopper.

In the adjustment of the gate and the operation of the gate, it is desirable to provide a control apparatus. The control apparatus requires a control which may be adjusted to the position of the gate relative to the discharge aperture, and allow the control to be readily available for operation by an operator.

The ordinary distribution and marketing of fertilizer spreaders requires that the spreader be packaged. It is desirable to have the spreader in as small a package as possible to improve economies in storage and transportation.

SUMMARY OF THE PRESENT INVENTION

The present invention relates to an improved fertilizer spreader construction. The instant spreader includes an injection molded plastic hopper for holding a granular fertilizer. The hopper is defined by a plurality of flat panels formed integral with each other having an open top and sloping inward toward the bottom of the hopper. The open top has a reduced pouring edge portion formed by edges of panels to facilitate pouring of granular fertilizer out through the top of the hopper. The hopper has a discharge aperture adjacent to the bottom. A plastic handle is connected to the hopper for manipulating the hopper. The handle may be selectively taken apart to minimize the size of a container to hold the spreader. The plastic handle has an elongated hollow shaft and a plastic gripper portion adapted to be held by an operator. An injection molded plastic gate is positioned for controlling the rate of discharge of fertilizer through the discharge aperture. A control apparatus is mounted on the handle adjacent to the gripper portion. The control apparatus includes a plastic molded housing having a plastic molded latch pivotally mounted in the housing. A plastic molded dog releasably engages the latch. An adjustment wheel is rotatably connected to the dog. A connector has one end secured to the gate for moving the gate, and the other end is threadedly connected to the wheel for positioning the connector relative to the dog, and thereby selectively positioning the gate relative to the discharge aperture. An activator grip is formed integral with the dog and is positionable adjacent to the gripping portion. A release is pivotally mounted in the handle and is formed integral with the latch. A plastic indicator is fixed to the connector. An injection molded plastic scale is movably mounted in the housing and is cooperative with the indicator to indicate the position of the gate relative to the discharge aperture. A pivotal support leg is connected to the hopper. A rod is connected to the pivotal support leg at one end and the latch at the other end, whereby positioning of the fertilizer spreader in an attitude in which the support leg lends support to the hopper releases the latch from the dog to allow the gate to be positioned in an attitude for interrupting the flow of fertilizer through the discharge aperture. An agitator is movably mounted in the hopper. A pair of wheels support the hopper, and one of the wheels is connected to the agitator for rotating the agitator as the fertilizer spreader is moved.

BRIEF DESCRIPTION OF THE DRAWINGS

FIG. 1 is a perspective view of a broadcast type fertilizer spreader embodying the instant invention in an attitude for movement and for spreading fertilizer;

FIG. 2 is an enlarged fragmentary perspective view showing an improved connection between a rod and an anchor end of a pivotally mounted leg of the spreader of FIG. 1;

FIG. 3 is a perspective view of a drop type fertilizer spreader embodying the herein disclosed invention shown in an attitude for discharging fertilizer but with the handle shown in an exploded view with an upper end spaced away from a lower end;

FIG. 8 is a perspective view of the broadcast type fertilizer spreader similar to that shown in FIG. 1, but with portions of the control broken away in order to show better interrelationship of parts thereof;

FIG. 9 is a perspective view of a portion of the fertilizer spreader of FIG. 8 showing fertilizer being poured out of a hopper into a container;

FIG. 10 is a perspective view of the fertilizer spreader of FIG. 8 showing the fertilizer spreader in an attitude whereby the fertilizer spreader is positioned on a pivotal leg which causes an automatic shut off of fertilizer from the hopper;

FIG. 11 is a perspective view of the drop type fertilizer spreader of FIG. 3 shown in an attitude for discharging fertilizer;

FIG. 12 is a perspective view of a portion of the fertilizer spreader of FIG. 11 showing fertilizer being poured out of a hopper of the fertilizer spreader;

FIG. 13 is a perspective view of the fertilizer spreader of FIG. 11 showing the fertilizer spreader in a resting attitude wherein a gate controlling discharge of fertilizer from a hopper is automatically positioned in a closed attitude to interrupt the discharge of fertilizer from the hooper;

FIG. 14 is an end elevational view of a gripping portion of a handle and a portion of a control apparatus which is adapted for use either with the broadcast type fertilizer spreader shown in FIGS. 1, 8, 9 and 10 or with the drop type fertilizer spreader shown in FIGS. 3, 11, 12 and 13;

FIG. 15 is a plan elevational view of a portion of the handle and control apparatus shown in FIG. 14 with portions broken away to show the interrelationship of the parts and showing the control apparatus in an unlocked attitude;

FIG. 16 is similar to FIG. 15 but showing the control apparatus in an attitude wherein the control apparatus has been placed in an unlocked attitude before movement of a portion of the control apparatus;

FIG. 17 is a side elevational view of the handle and control apparatus shown in FIG. 15, showing an adjustment wheel for positioning a gate relative to a discharge aperture in a hopper;

FIG. 18 is a cross-sectional view taken on Line 18—18 of FIG. 17;

DESCRIPTION OF THE PREFERRED EMBODIMENTS

Figure 4:
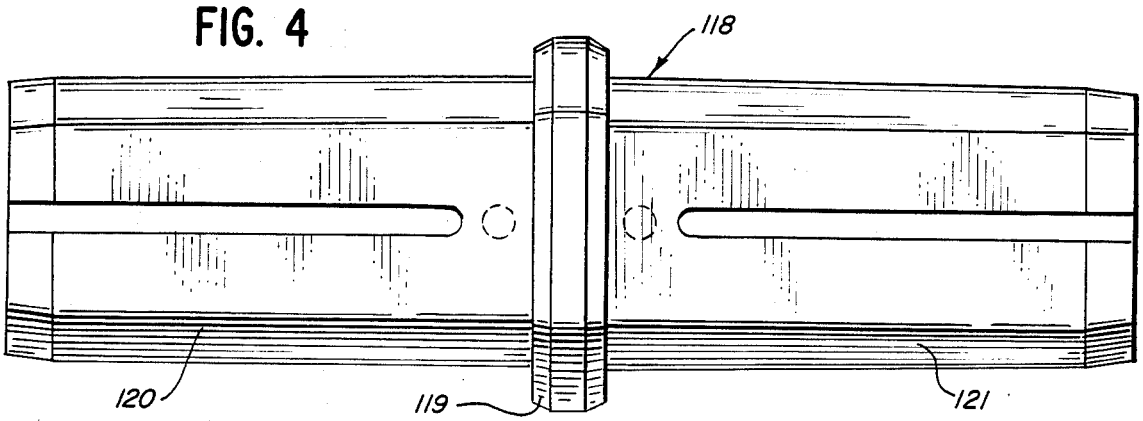
FIG. 4 is a top view of a joint for holding the upper end of the handle in releasable connection to the lower end of the handle.
Figure 5:
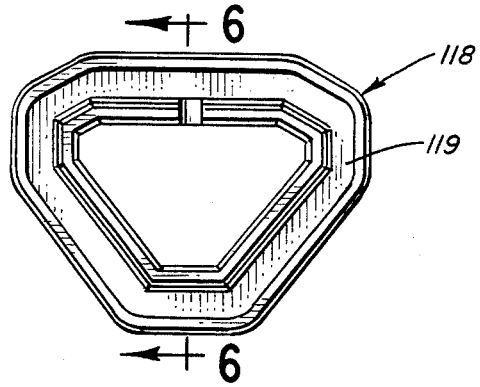
FIG. 5 is a cross-sectional view taken on Line 5—5 of FIG. 4 showing the joint in connection with portions of the handle.
Figure 6:
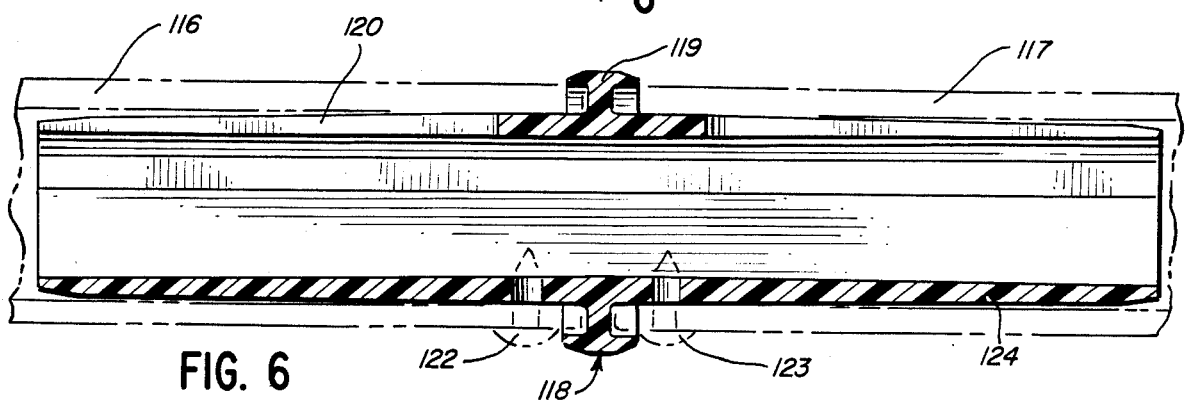
FIG. 6 is a cross-sectional view taken on Line 6—6 of FIG. 5 showing the joint having a pair of opposed tubular sleeves telescopically positioned in the upper portion of the lower end of the handle with the lower portion and the upper end of the handle shown in phantom view.
Figure 7:
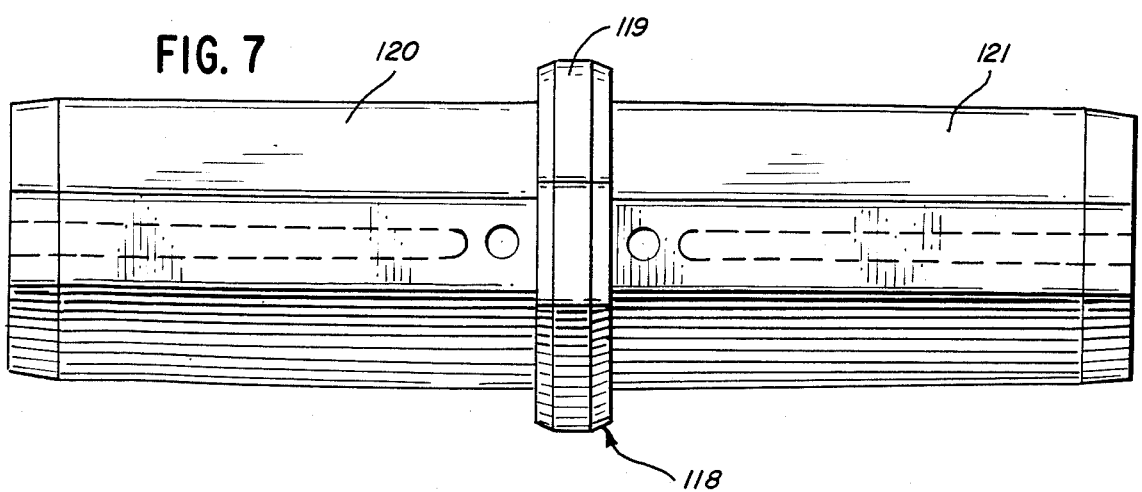
FIG. 7 is a bottom view of the joint shown in FIG. 4.
Figure 19:
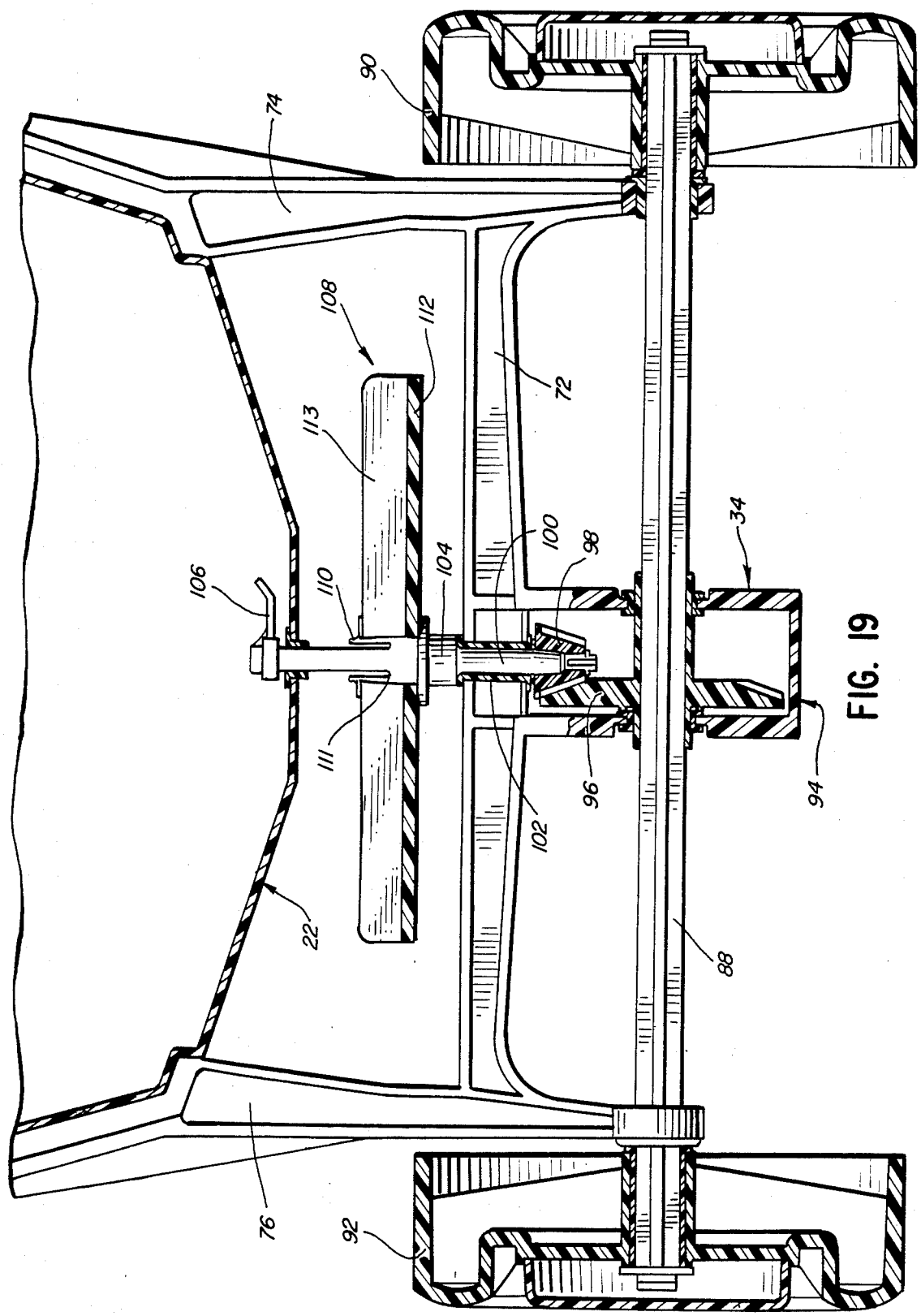
FIG. 19 is an enlarged cross-sectional view of a portion of the broadcast type fertilizer spreader shown in FIGS. 1, 8, 9, and 10, showing the interrelationship of the support, frame, wheels, axle, drive assembly, propeller, and hopper.

Referring now to the drawings, and especially to FIGS. 1, 8, 9, and 10, a broadcast type fertilizer spreader generally indicated by numeral 20 is shown therein. Spreader 20 is a specific embodiment of the herein disclosed invention. The instant broadcast type fertilizer spreader generally includes an injection molded plastic hopper 22 mounted in a plastic frame 24. A plastic gate assembly 26 is mounted on the hopper. A plastic handle 28 is fixed to the frame for manipulating the frame and the hopper. A control apparatus or assembly 30 is mounted on the handle and is connected to gate assembly 26 for selectively positioning a portion of the gate assembly. A wheel assembly 32 supports the frame and is drivingly connected to a drive assembly 34. A pivotal leg 38 is supportingly connected to the frame and is connected to the control apparatus 30.

Hopper 22 is an injection molded plastic part made of a suitable plastic, such as, polyethylene. The hopper is formed of a plurality of flat panels which have their edges formed integral with each other. As may be best seen in FIG. 9, the hopper includes a pair of front side panels 40 and 42 connected by a front panel 44. Rear side panels 46 and 48 are connected by rear panel 50. A left side panel 52 connects panels 40 and 46, and a right side panel 54 connects panels 42 and 48. The side panels 52 and 54 are relatively narrow so that the top of the hopper defines a pair of opposed pouring edges to provide a convenient means for pouring fertilizer out of the spreader. Rear panel 50 has a discharge aperture 56 formed therein to allow fertilizer to flow out of the hopper.

Gate assembly 26 is positioned adjacent to discharge aperture 56. The gate assembly includes a molded plastic integral guide 58 fixed to rear panel 50. A gate 60 is slidably mounted in guide 58 to be selectively positioned adjacent to discharge aperture 56 for regulating the discharge of material through the discharge aperture. Guide 58 includes a pair of tracks 62 and 64 which slidably receive gate 60. The guide includes an integral cross beam 66 which holds the tracks in a spaced relationship and provides support for the gate. The gate includes a body 68 with an ear 70 formed integral therewith for connection to the control apparatus. A gate lock post 71 is formed integral with body 68 and is spaced away a short distance from ear 70 to receive a portion of the control apparatus between the gate lock post and the ear, as will be described in detail hereinafter.

Frame 24 is also an injection molded plastic part which has a main beam 72 extending across the bottom of the hopper. A pair of columns 74 and 76 is formed integral with the main beam. Columns 74 and 76 supportingly engage the hopper. A pair of bracket arms 78 and 80 is formed integral with columns 74 and 76, respectively. The bracket arms are jointed at a pivot head 82 which has a post 84 formed integral therewith. Post 84 extends upward therefrom. The post has a handle connector 86 formed integral with its upper end. The handle connector is connected to handle 28 and also supports the hopper, as do columns 74 and 76.

Wheel assembly 32 includes a plastic axle 88 which is rotatably mounted in columns 74 and 76. Wheels 90 and 92 are mounted on axle 88. Wheel 90 is drivingly connected to axle 88 to drive drive assembly 34.

Drive assembly 34 includes a molded plastic housing 94. A molded plastic bevel gear 96 is mounted in the housing and is secured to axle 88 for rotation with the axle. A plastic bevel pinion 98 meshes with gear 96. Pinion 98 is also a molded plastic part. A plastic drive shaft or broadcast shaft 100 is rotatably mounted in a shaft aperture 102 in main beam 72. The drive shaft includes a drive shaft collar 104 which rides on top of beam 72. The bevel pinion 98 is secured to the lower end of the drive shaft to drive the drive shaft. The drive shaft has its upper end positioned in the bottom of hopper 22. A plastic agitator 106 is fixed to the upper end of the drive shaft for moving granular fertilizer contained in the hopper. A molded plastic propeller 108 is drivingly mounted on the drive shaft. A lock 110 extends through a central aperture 111 in the propeller to prevent the propeller from moving axially along the drive shaft. Propeller 108 includes a floor or base 112 with a plurality of vanes 113 formed integral with the floor. Floor 112 is scalloped between the vanes to allow fertilizer to be discharged easily from the propeller. The propeller, as may be seen in FIGS. 8 and 10, is positioned below the discharge aperture so that fertilizer falls through the discharge aperture onto the propeller. As the propeller rotates, the fertilizer is flung off the propeller.

Handle 28 includes an elongated hollow shaft 114 and a gripper section or portion 115 which is fixed to the upper portion of shaft 114. The upper portion is a molded plastic part which is adapted to be held by an operator. Shaft 114 is made up of an extruded plastic elongated hollow upper end 116 and an extruded plastic elongated hollow lower end 117 with a connector or joint 118 releasably securing the upper end to the lower end. Joint 118 is a molded plastic part having an annular collar or ring 119 with a tubular sleeve 120 formed integral with one side of the ring and a tubular sleeve 121 formed integral with the other side of the ring. Tubular sleeve 120 telescopically fits inside of the lower portion of upper end 116 and is secured therein by a conventional screw fastener 122. Tubular sleeve 121 telescopically fits into the upper portion of lower end 117. A conventional screw fastener 123 secures tubular sleeve 121 in the upper portion of the lower end. Handle connector 86 is secured to the lower portion of lower end 117 to secure handle shaft 114 to the frame and to hopper 22. By removing either fastener 122 or fastener 123, the upper end of the handle may be removed from the lower end and thereby shorten the handle for shipping and packaging.

Control apparatus 30 is mounted on the handle adjacent to the gripper portion. The control apparatus includes an injection molded high impact acrylonitrile-butadiene-styrene copolymer handle housing 124. Housing 124 has a release lever slot 125 in its upper portion with a molded integral plastic latch assembly 126 pivotally mounted in the housing and having a portion positioned in slot 125. The latch assembly rotates on a shaft 128 which is press fitted into the housing. The latch assembly includes a lever 130 which has an integral latch 132 on one end and an integral release handle 134 on the other end. A spring arm 136 is formed integral with the lever and has its free end in engagement with a stop 138 which is formed integral with a carrier 140.

The control assembly includes the integrally molded plastic carrier 140 which also has a dog 142 formed integrally therewith. The dog is engageable with latch 132 so that the latch releasably holds the carrier adjacent to gripper portion 115. Carrier 140 has an activator grip 144 formed integral therewith. The grip extends outward from the housing parallel to the gripper portion of the handle. Ears 146 and 148 are formed integral with the carrier to receive rotatably a plastic adjustment wheel 150. A threaded adjustment rod 152 is threadedly mounted in wheel 150 and has an indicator 154 fixed on its lower end. The indicator cooperates with a plastic scale housing 156 which is formed integral with carrier 40. The scale housing has a molded plastic removable scale indicia 158 mounted therein. The scale includes a pair of scale mounting ears 160 and 162 for removably locking the scale in the scale housing so that scales with different indicia may be used with the same scale housing for different types of fertilizer or other material. A coil spring 169 has one end fixed to a spring retention post 166 in the housing. The other end of the spring is secured to carrier 140 so that the carrier is constantly urged downward towards the hopper. Threaded adjustment rod 152 is connected to a metal gate connector 168 which has a portion movably positioned in the hollow shaft of the handle. One end of connector 168 has a hook 170 which is attached to the adjustment rod and the other end has a hook 172 which is inserted in an opening in ear 70 of gate 60. The connector has a portion positioned between the gate lock post and the ear so that the hook will not come out of the opening in the ear during normal usage. It may be appreciated that the connector may be inserted in the opening by pulling a portion of the connector toward the ear and when the resilience of the connector pulls the rod back into an in line position, the connector is secured to the gate. Thus, as the carrier moves away from the hopper against spring 164, gate 60 is moved toward the gripper portion to expose the discharge aperture. The position of the gate relative to the discharge aperture may be adapted by movement of the adjustment rod relative to the carrier.

Control apparatus 30 includes a molded plastic release lever 174 which is pivotally mounted on a release lever shaft 176 which is a metal spring pin pressed into bosses on housing 124. The release lever includes a push arm 178 which is engageable with lever 130 between latch 132 and shaft 128. A pull arm 180 is formed integral with the push arm. A rod 182 has a substantial portion positioned in hollow shaft 114. The rod has one end attached to pull arm 180 so that when rod 182 is pulled downward, push arm 178 pushes lever 130 to rotate the lever on shaft 128 and thereby move latch 132 out of engagement with dog 142. When the latch no longer holds the dog, spring 164 moves the carrier toward the hopper and connector 168 pushes the gate under the discharge aperture to interrupt the flow of material from the hopper.

Leg 38 is pivotally mounted in pivot head 82. The leg includes a strut 184 with a foot 186 formed integral therewith. The strut pivots on a leg pivot pin 188. The strut has an anchor end 190 with an aperture 191 in one end which receives the lower end of rod 182. The anchor end includes a foot lock post 193 formed integral with the anchor end and being spaced away slightly from that portion of the anchor end having opening 191. Thus, rod 182 which has a hook 195 formed therein may be bowed slightly to insert hook 195 into opening 191 and the resilience of the rod straightens the rod to pivot the hook as shown in FIG. 2, and thereby lock rod 182 to the anchor end of the leg. The position of the leg controls the attitude of lever 174.

The instant fertilizer spreader is filled with a granular material, such as fertilizer 192, from the top. In order to spread the fertilizer, the fertilizer spreader is pivoted upward so that leg 38 does not engage the supporting surface. Grip 144 is pulled upward by the operator toward the gripper portion until dog 142 displaces latch 132 slightly against spring arm 136 and the dog then catches on the latch. The dog is held by a latch as in the carrier. As the carrier is moved upward against the force of spring 164, rod 168 is pulled upward to pull gate 60 upward toward the gripper portion. When it is necessary to adjust the opening in the discharge aperture, the position of the gate is adjusted relative to the discharge aperture. This is accomplished by rotating wheel 150 which moves the adjustment rod relative to the carrier and thus the position of the gate relative to the discharge aperture is adjusted. In certain instances, it may be found that it is also necessary to adjust the position of scale 156. The position of the scale may also be adjusted simply by moving it relative to the housing. As was mentioned above, scale indicator 158 may be replaced and another scale indicator inserted, depending upon the type of material which is placed in the hopper.

Once the discharge aperture is open, the rate of flow of material is regulated by the gate. The material drops out of the discharge aperture due to gravity. The material drops onto the base or floor 112 of propeller 108. As the fertilizer spreader is moved on the supporting surface, wheel 90 rotates shaft 88 which in turn drives gear 96, which in turn meshes with pinion 98. The rotation of pinion 98 rotates drive shaft 100 which rotates agitator 106 in the bottom of the hopper. In addition, the propeller rotates and the material which falls onto plate 112 is held by vanes 113 so that centrifugal force throws the fertilizer outward from the propeller as the propeller rotates.

Once the operator stops the spreader, he simply allows the spreader to rest on foot 186 of leg 38 which causes the anchor end to pivot toward the axle and away from the handle, thereby pulling rod 182 downward. The movement of the rod downward rotates release 174 so that push arm 178 pushes lever 130 against spring arm 136 to disengage the latch from dog 142. Coil spring 164 then pulls the carrier downward and with it pushes connector 168 downward, thereby pushing the gate in the gate slide across the discharge opening to interrupt the flow of material through the discharge aperture. Thus, the flow of material is automatically interrupted when the fertilizer spreader is put to rest.

In the event that there is material left in the hopper, it is desirable to remove the material from the hopper. The present hopper construction is one wherein the sides form reduced pouring edges which are formed by the edges of the panels to facilitate pouring of material out of the hopper through the top. In view of the fact that all of the parts of the fertilizer spreader are made of plastic, except for the rod and the connector, the fertilizer spreader is not subject to corrosion.

Referring now to FIGS. 3, 11, 12 and 13, a drop type fertilizer spreader 200 is shown therein, and spreader 200 is another embodiment of the herein disclosed invention. Fertilizer spreader 200 includes an injection molded plastic hopper 202 which is supported on a wheel assembly 204. A gate assembly 206 is movably mounted on the hopper to regulate the rate of discharge of material from the hopper. A handle 208 is connected to the hopper and has a control apparatus 210 mounted thereon. A pivot leg 212 is pivotally secured to the hopper for supporting the hopper and controlling the flow of material from the hopper.

Hopper 202 has its upper portion made up of a plurality of flat panels which have their edges formed integral therewith. Front side panels 214 and 216 are connected by a front panel 218. Rear side panels 220 and 222 are connected by a rear panel 224. Side panels 214 and 220 are connected by a left side panel 226 and side panels 216 and 222 are connected by a right side panel 228. A rear bottom panel 230 is formed integral with rear side panels 220 and 222, and rear panel 224. A front bottom panel 232 is formed integral with front side panels 214 and 216 and front panel 218. The bottom of the hopper is defined by a curved bottom discharge portion 234 which is formed integral with front bottom panel 232 and rear bottom panel 230. The bottom discharge portion has a plurality of discharge apertures 236 along its length to allow material to fall out of the hopper.

Figure 20:
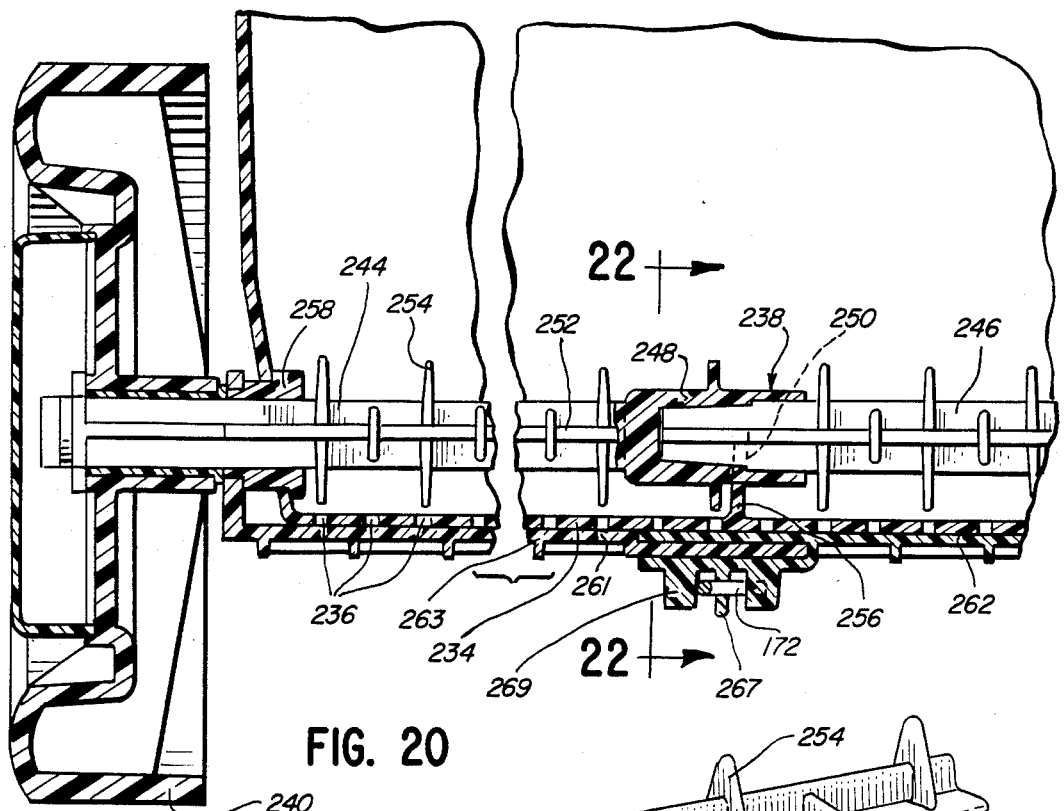
FIG. 20 is an enlarged fragmentary cross-sectional view of the lower portion of a hopper and a portion of the axle agitator contained therein of the drop type fertilizer spreader shown in FIGS. 3, 11, 12 and 13.
Figure 21:
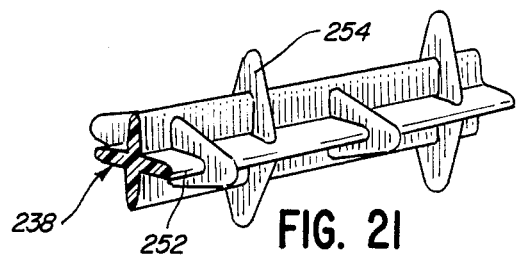
FIG. 21 is a fragmentary perspective view of a portion of the axle agitator of the drop type fertilizer spreader.

Wheel assembly 204 includes an axle agitator 238 which connects side panel 226 to 228. A plastic wheel 240 is mounted on one end of the axle agitator and a plastic wheel 242 is mounted on the other end of the axle agitator. The axle agitator includes a female half 244 and a male half 246. The female half includes a receptacle portion 248 which receives a mating portion 250 from the male half 246 as may be best seen in FIG. 20. Each of the male and female portions of the agitator have a basic cruciform cross section 252 as shown in FIG. 21 with a plurality of vanes 254 formed integral therewith. The cruciform construction mates with wheel 240 so that rotation of the wheel causes the axle agitator to rotate. The hopper includes a support 256 formed integral with its lower portion which rotatably engages the receptacle portion 248 to support the axle agitator adjacent to its mid point. The axle agitator is supported by a pair of axle agitator supports 258 which are mounted in the right and left side panels.

Figure 22:
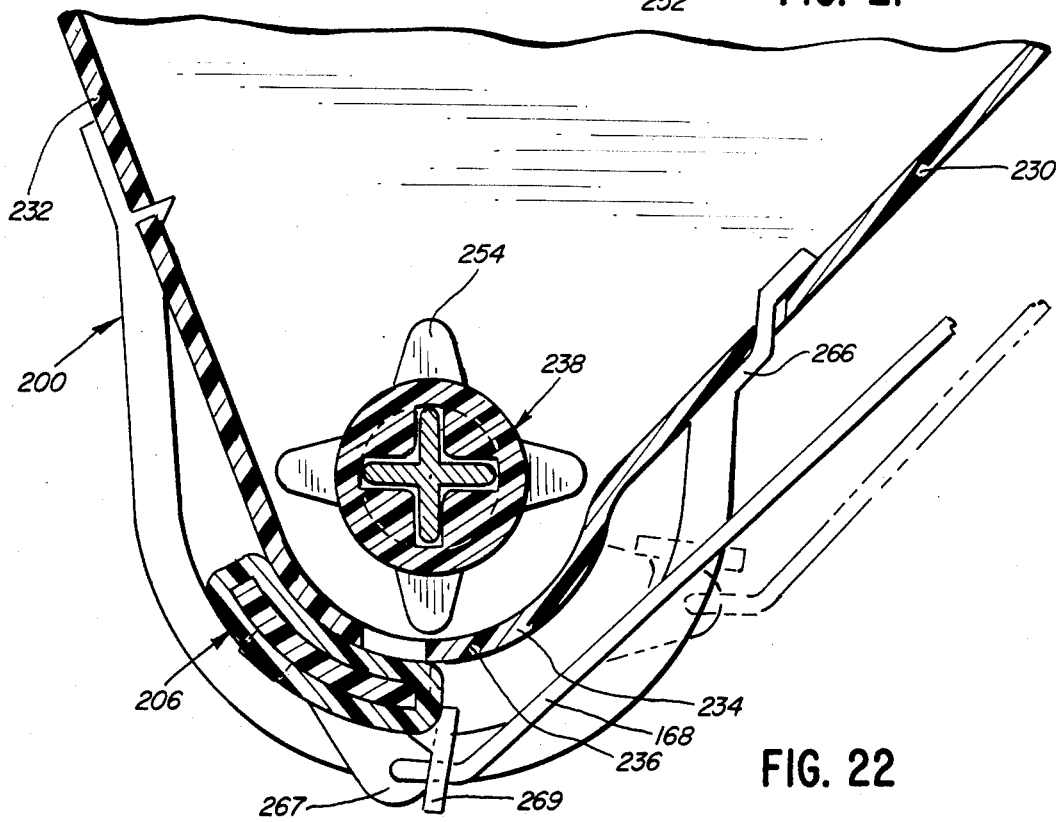
FIG. 22 is an enlarged cross-sectional view taken on Line 22—22 of FIG. 20 showing the position of an axle agitator in the hopper of the drop type fertilizer spreader.
Figure 23:
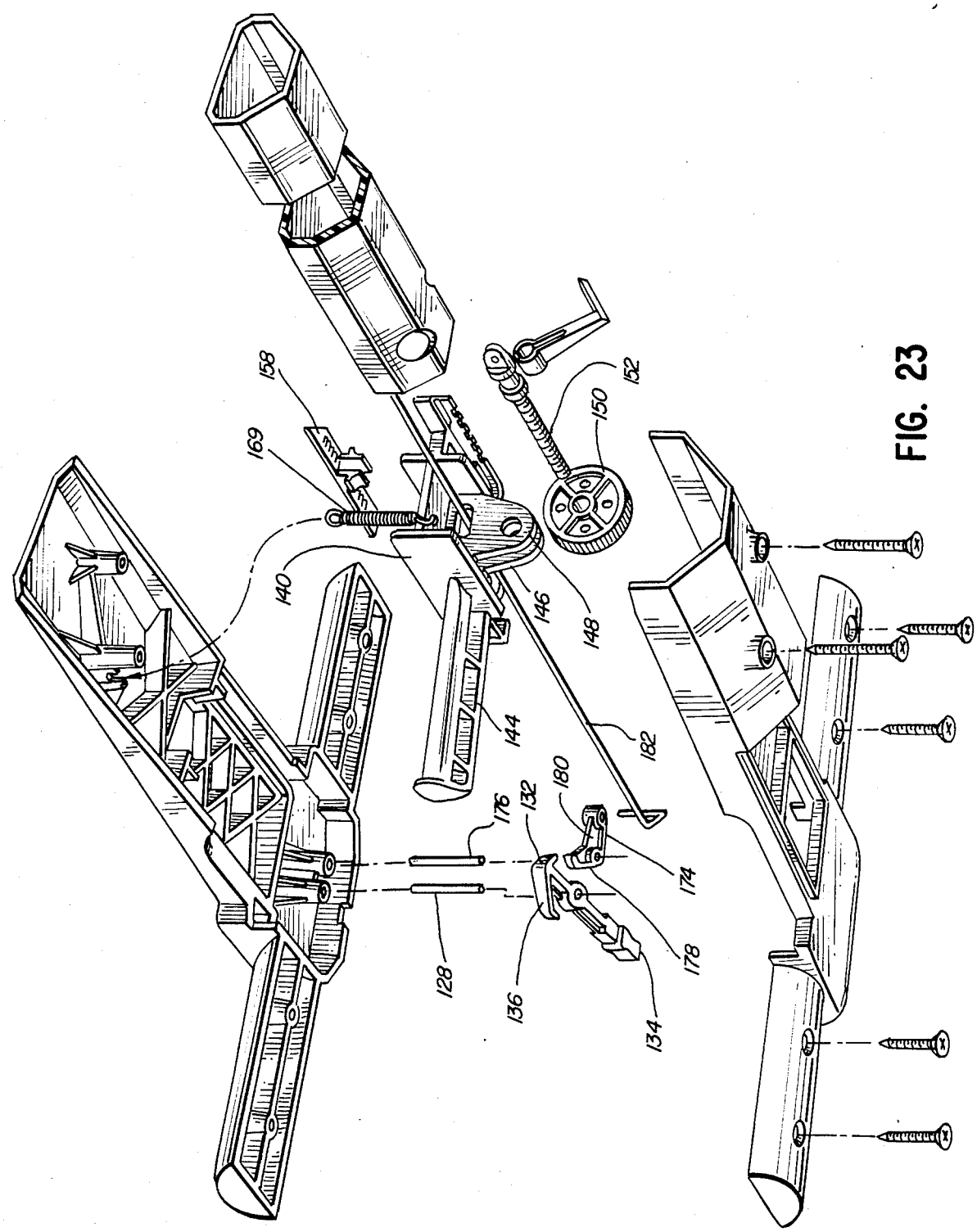
FIG. 23 is an enlarged exploded perspective view of the control apparatus and a portion of the handle showing the interrelationship of various parts of the control apparatus.

Gate assembly 206 is mounted on the hopper. The gate assembly includes a gate 260 which has a blade 261 which blade conforms in part to the exterior surface of bottom portion 234. Blade 261 includes a male half 262 and a mating female half 263. The blade has a pair of ears 264 pivotally mounted on agitator supports 258 so that the blade swings about the same axis as the axis of rotation as the axle agitator. The gate is supported by a gate support 266 to prevent the gate from sagging at its center. Blade 261 includes a tab 268 formed integral therewith which forms a means for connecting the gate with the control apparatus. Blade 261 may be positioned with the blade beneath the discharge apertures to stop the flow of material from the hopper, as shown in FIG. 20. When the blade is moved to the position shown in dotted form in FIG. 22, the material is allowed to flow out of the discharge apertures. By selectively positioning the blade over a portion of each of the discharge apertures, the rate of flow of material may be controlled, thereby determining the amount of material which is delivered by the fertilizer spreader.

Handle 208 is substantially identical to handle 28 described in detail above. Handle 208 includes a plastic hollow shaft 269 with a gripper portion 270 which is identical to gripper portion 115. Hollow shaft 269 includes an extruded plastic hollow upper end 271 and an extruded plastic hollow lower end 272 connected by joint 273 which is identical in construction to joint 118. The lower portion of lower end 272 of handle 208 is secured to hopper 202 for manipulating the hopper.

Control apparatus 210 is identical in construction to control apparatus 30 described in detail above. The same numbers to like parts are applied herein. The control apparatus has its connector 168 secured to the blade. The blade includes an ear 267 with an aperture 268 formed therein. A gate lock post 269 is formed integral with the blade and spaced from the ear to receive the connector. The connection of the connector to the blade is made in the same way as that described in connection of the connector with gate 60. The control apparatus has its rod 182 secured to leg 212. The connector and the rod are movably mounted in hollow shaft 270.

Leg 212 includes a strut 274 with a foot 276 formed integral with its lower end to provide a means for supporting the leg. An anchor portion 278 is formed integral with the strut 274 and the anchor portion is connected to rod 182. Two bracket plates 280 and 282 are an integral part of hopper 202 and are fixed to shaft 269 of the handle. Strut 274 is pivotally mounted between bracket plates 280 and 282 so that the leg is pivotal relative to the hopper.

The drop type fertilizer spreader 200 operates in much the same manner as the broadcast type fertilizer spreader described in detail above, except for the basic difference that the material is dropped rather than spread by a propeller. Once the hopper is filled with a material, such as a fertilizer 284, the operator raises the handle so that foot 276 disengages the supporting surface. As the operator pushes the fertilizer spreader forward, the wheels rotate and with them rotates the axle agitator within the hopper. In order to discharge fertilizer from the hopper, the operator need only pull up on activator grip 144 which locks the blade in an open position, that is, the blade does not interrupt the flow of material through the discharge apertures. The rate of discharge may be adjusted by adjusting wheel 150 as described above, and the proper indicator may be positioned in the scale. As the operator moves the spreader along a supporting surface, the material drops through the discharge apertures and onto the ground below the hopper. When the operator wishes to stop movement of the fertilizer, he simply stops and lowers the handle so that the foot rests on the supporting surface to pull on rod 182, and thereby allow the blade to move forward as described above. In the event that the operator wishes to shut off the flow of fertilizer while the spreader is moving, he may simply move release 134 to one side which releases dog 142, and thereby allows the gate to close.

In the event that there is fertilizer still left in the hopper upon completion of the fertilization of a given area, the fertilizer may be returned to its original container or another container by pouring the fertilizer out through the top along one of the pouring edges defined by the top edge of the side panel and the top edges of a front side panel and a rear side panel.

All of the parts of fertilizer spreader 200 are made of plastic, except for the connector, the rod of the control apparatus, and conventional fasteners. Thus, there is very little corrosion of the parts of the fertilizer spreader.

In the case of both the fertilizer spreader 20 and fertilizer spreader 200, all parts being made of plastic may be readily cleaned simply by washing the parts with water. A garden hose makes a suitable source of water for use in the home. The fact that the devices are made of plastic allows the spreaders to be hosed down to wash out all fertilizer. Once the fertilizer spreaders are washed down, they may be allowed to air dry without fear of corrosion. In many instances, it is necessary to make certain that one fertilizer has been completely removed before another fertilizer is used. For instance, some fertilizer may contain a weed killer which could be damaging to certain desirable ornamental plants.

Although the devices disclosed herein are referred to as fertilizer spreaders, it is readily apparent that the devices are called fertilizer spreaders because of the common accepted name for these devices. These devices may be used for other purposes other than spreading fertilizer, that is, a granular free flowing material may be distributed over a given area. Typical uses are use for spreading granulated limestone, bone meal, and selected slow release herbicides.

Although the specific embodiments of the herein disclosed invention have been shown and described in detail above, it is readily apparent that those skilled in the art may make various changes and modifications without departing from the spirit and scope of the present invention. It is to be expressly understood that the instant invention is limited only by the appended claims.

In the claims:

1. A fertilizer spreader comprising; a hopper for holding a granular material, a handle connected to the hopper for manipulating the hopper, said hopper having a discharge aperture in its lower portion to allow granular material to discharge from the hopper, a gate selectively positionable adjacent to the discharge aperture in the hopper for controlling the rate of discharge of material from the hopper through the aperture, a control apparatus, a pivotal support leg, and means for connecting the pivotal support leg to the control apparatus in such a way that positioning of the fertilizer spreader in an attitude in which the support leg lends support to the hopper operates the control apparatus.

2. A fertilizer spreader as defined in claim 1, wherein said control apparatus includes; a latch, a dog releasably engageable with the latch, a connector having one end secured to the gate, and a position control device adjustably securing the other end of the connector to the dog for selectively positioning that end of the connector relative to the dog and threby controlling the position of the gate relative to the aperture for regulating the flow of granular material through the aperture.

3. A fertilizer spreader as defined in claim 1, wherein the control apparatus includes; a housing, a connector having one end secured to the gate for positioning the gate relative to the discharge aperture, locking means for holding one end of the connector relative to the housing, a position control apparatus connected to the connector for selectively positioning the connector relative to the locking means for holding one end of the connector relative to the housing, an indicator secured to the connector, and a scale selectively positionable on the housing and cooperative with the indicator to indicate the position of the gate relative to the discharge aperture.

4. A fertilizer spreader as defined in claim 1, wherein said control apparatus includes; a housing, a connector having one end secured to the gate, means connected to the other end of the connector for releasably locking the connector in a selected position for holding the gate in a selected position, an activator grip connected to the connector for moving the connector, said activator grip being positionable adjacent to a portion of the handle, and a release having a portion extending from the handle for selectively releasing the connector from the means connected to the other end of the connector for releasably locking the connector in a selected position.

5. A fertilizer spreader as defined in claim 1, wherein said hopper includes a plurality of flat panels formed integral with each other defining an open top, said panels sloping inward toward the bottom, said open top having a reduced pouring edge portion for pouring a granular material out of the hopper through the top.

6. A fertilizer spreader as defined in claim 1, wherein said control apparatus is mounted on the handle, said control apparatus includes; locking means, a connector having one end connected to the gate, and a dog connected to the other end of the connector, said dog being releasably engageable with locking means, said connector being positioned in a portion of the handle.

7. A fertilizer spreader as defined in claim 1, including; an axle having a portion rotatably mounted in the hopper, a pair of wheels mounted on the axle for supporting the hopper, and an agitator fixed to the axle for engaging granular material contained in the hopper to break up masses of granular material to facilitate discharge of the granular material through the discharge aperture.

8. A fertilizer spreader as defined in claim 1, including; an axle supporting said hopper, a wheel mounted on each of opposite ends of said axle, one of said wheels being drivingly connected to the axle to rotate the axle with the wheel, a bevel gear connected to the axle, a bevel pinion meshing with the gear, a drive shaft connected to the bevel pinion, and a propeller mounted on the shaft, said propeller having a portion below the discharge aperture of the hopper for receiving granular material from the hopper and spreading it as the propeller rotates with the shaft during rotation of the wheel drivingly connected to the axle.

9. A fertilizer spreader as defined in claim 1, wherein the control apparatus includes; a latch, a dog releasably engageable with the latch, a connector having one end secured to the gate, a position control device connecting the other end of the connector with the dog for selectively positioning the end of the connector relative to the dog, an indicator connected with the connector, and a scale selectively positionable relative to the indicator and cooperative with the indicator to indicate the position of the gate relative to the discharge aperture.

10. A fertilizer spreader as defined in claim 1, wherein the control apparatus includes; a latch, a dog releasably engageable with the latch, a connector having one end secured to the gate, a position control device connecting the other end of the connector with the dog for selectively positioning the end of the connector relative to the dog and thereby controlling the position of the gate relative to the discharge aperture, an activator grip secured to the connector for moving the connector, said activator grip being positionable adjacent to a portion of the handle, and a release having a portion extending from the handle for selectively releasing the dog from the latch.

11. A fertilizer spreader as defined in claim 1, wherein the hopper includes a plurality of flat panels formed integral with each other and having an open top, said panels sloping inward toward the bottom, said open top having a reduced pouring edge portion for pouring a granular material out of the hopper through the top, said control apparatus including; a latch, a dog releasably engageable with the latch, a connector having one end secured to the gate, and a position control device connecting the other end of the connector with the dog for selectively positioning the end of the connector relative to the dog and thereby controlling the position of the gate relative to the discharge aperture.

12. A fertilizer spreader as defined in claim 1, wherein the handle includes; a hollow shaft portion and a gripper portion adapted to be held by an operator, said control apparatus includes; a latch, a dog releasably engageable with the latch, a connector having a portion mounted in the hollow shaft portion of the handle, said connector having one end secured to the gate, and a position control device connected to the other end of the connector, said position control device connecting the connector with the dog for selectively positioning the end of the connector relative to the dog and thereby controlling the position of the gate relative to the discharge aperture.

13. A fertilizer spreader as defined in claim 1, wherein the control apparatus includes; a latch, a dog releasably engageable with the latch, a connector having one end secured to the gate, and a position control device connecting the other end of the connector with the dog for selectively positioning the end of the connector relative to the dog and thereby controlling the position of the gate relative to the discharge aperture; and including; an axle having a portion rotatably mounted in the hopper, a pair of wheels mounted on the axle for supporting the hopper, and an agitator for engaging granular material contained in the hopper to break up masses of granular material to facilitate discharge of the material through the discharge aperture, said agitator being fixed to the axle.

14. A fertilizer spreader as defined in claim 1, wherein the control apparatus includes; a latch, a dog releasably engageable with the latch, a connector having one end secured to the gate, and a position control device securing the other end of the connector with the dog for selectively positioning the end of the connector relative to the dog and thereby controlling the position of the gate relative to the discharge aperture; and including, an axle supporting said hopper, a wheel on each of opposite ends of said axle, one of said wheels being fixed to the axle to rotate the axle with the wheel, a bevel gear connected to the axle, a bevel pinion meshing with the gear, a drive shaft having one end drivingly connected to the bevel pinion, an agitator connected to the other end of the shaft, and a propeller mounted on the shaft, said propeller having a portion below the discharge aperture of the hopper for receiving granular material from the hopper and spreading it as the propeller rotates with the shaft during rotation of the wheel fixed to the axle.

15. A fertilizer spreader as defined in claim 1, wherein said hopper includes; a plurality of flat panels formed integral with each other having an open top, said panels sloping inward toward the bottom, said open top having a reduced pouring edge portion for pouring a granular material out of the hopper through the top, said control apparatus including; a housing, a connector having one end secured to the gate, means connected to the other end of the connector for releasably locking the connector in a selected position for holding the gate in a selected position, an activator grip secured to the connector for moving the connector, the activator grip being positionable adjacent to the handle, and a release having a portion extending outward from the handle for selectively releasing the connector from the means for selectively locking the connector.

16. A fertilizer spreader as defined in claim 1, wherein said hopper includes; a plurality of flat panels formed integral with each other having an open top, said panels sloping inward toward the bottom, said open top having a reduced pouring edge portion for pouring a granular material out of the hopper through the top, said handle having a hollow shaft portion, said control apparatus including; a latch, a dog releasably engageable with the latch, a connector having a portion movably mounted in the hollow shaft and having one end secured to the gate, and a position control device connecting the other end of the connector with the dog for selectively positioning the other end of the connector relative to the dog.

17. A fertilizer spreader as defined in claim 1, wherein said control apparatus includes; locking means, a connector having one end secured to the gate, a dog connected to the other end of the connector and being releasably engageable with the locking means, and including, an axle having a portion rotatably mounted in the hopper, a pair of wheels mounted on the axle for supporting the hopper, and an agitator fixed to the axle for engaging granular material contained in the hopper to break up masses of granular material to facilitate discharge of the granular material through the discharge aperture.

18. A fertilizer spreader as defined in claim 1, wherein the hopper includes; a plurality of flat panels formed integral with each other having an open top, said panels sloping inward toward the bottom, said open top having a reduced pouring edge portion for pouring a granular material out of the hopper through the top, and including; an axle having a portion rotatably mounted in the hopper, a pair of wheels mounted on the axle for supporting the hopper, and an agitator for engaging granular material contained in the hopper to break up masses of granular material to facilitate discharge of granular material through the discharge aperture, said agitator being fixed to the axle and having the same center of rotation as the axle.

19. A fertilizer spreader as defined in claim 1, wherein said hopper includes; a plurality of flat panels formed integral with each other having an open top, said panels sloping inward toward the bottom, said open top having a reduced pouring edge portion for pouring a granular material out of the hopper through the top; and including; an axle supporting said hopper, a wheel on opposite ends of said axle, one of said wheels being fixed to the axle to rotate the axle with the wheel, a bevel gear connected to the axle, a bevel pinion meshing with the gear, a drive shaft having one end connected to the bevel pinion, an agitator connected to the other end of the shaft and being positioned in the hopper, and a propeller mounted on the shaft, said propeller having a portion below the discharge aperture of the hopper for receiving granular material from the hopper and spreading the granular material as the propeller rotates with the shaft during rotation of the wheel fixed to the axle.

20. A fertilizer spreader as defined in claim 1, wherein said hopper includes; a plurality of flat panels formed integral with each other having an open top, said panels sloping inward toward the bottom, said open top having a reduced pouring edge portion for pouring a granular material out of the hopper through the top; said control apparatus having; a housing, a connector having one end secured to the gate, means secured to the other end of the connector for releasably locking the connector in a selected position for holding the gate in a selected position, an activator grip secured to the connector for moving the connector, and a release having a portion extending outward from a housing for selectively releasing the connector from the means for selectively locking the connector.

21. A fertilizer spreader as defined in claim 1, wherein said handle includes; a hollow shaft portion and a gripper portion adapted to be held by an operator; and said control apparatus includes; a housing, a connector movably mounted in the hollow portion of the shaft having one end secured to the gate, means connected to the other end of the connector for releasably locking the connector in a selected position, an activator grip secured to the connector for moving the connector, said activator grip being positionable adjacent to the gripper portion, and a release having a portion extending outward from the housing for selectively releasing the connector from the means for releasably locking the connector in a selected position.

22. A fertilizer spreader as defined in claim 1, wherein the handle includes a shaft portion and a gripper portion adapted to be held by an operator, said control apparatus includes; a housing, a connector having one end secured to the gate, means secured to the other end of the connector for releasably locking the connector in a selected position for holding the gate in a selected position, an activator grip secured to the connector for moving the connector, said activator grip being positionable adjacent to the gripping portion, and a release having a portion extending adjacent to the gripper portion for selectively releasing the connector from the means for releasably locking the connector in a selected position; and including; an axle having a portion rotatably mounted in the hopper, a pair of wheels mounted on the axle for supporting the hopper, and an agitator mounted in the hopper connected to the axle and having the same axis of rotation of the axle to break up masses of granular material to facilitate discharge of the granular material through the discharge aperture.

23. A fertilizer spreader as defined in claim 1, wherein said handle includes a shaft portion and a gripper portion adapted to be held by an operator, said control apparatus includes; a housing, a connector having one end secured to the gate, means secured to the other end of the connector for releasably locking the connector in a selected position for holding the gate in a selected position, an activator grip secured to the connector for moving the connector, said activator grip being positionable adjacent to the gripper portion, and a release having a portion extending adjacent to the gripper portion for selectively releasing the connector from the means for releasably locking the connector in a selected position for holding the gate in a selected position, and including; an axle supporting said hopper, a wheel on each of opposite ends of said axle, one of said wheels being fixed to the axle to rotate the axle with the wheel, a bevel gear connected to the axle, a bevel pinion meshing with the gear, a drive shaft having one end connected to the bevel pinion, an agitator connected to the other end of the shaft and being positioned in the hopper, and a propeller mounted on the shaft and having a portion below the discharge aperture of the hopper for receiving granular material from the hopper and spreading it as the propeller rotates with the shaft during rotation of the wheel fixed to the axle.

24. A fertilizer spreader comprising; an injection molded hopper for holding granular material, said hopper having a plurality of flat panels formed integral with each other having an open top, said panels sloping inward toward the bottom, said open top having a reduced pouring edge portion formed by edges of panels to facilitate pouring granular material out of the hopper through the top, said hopper having an elongated discharge edge at its lower portion, said discharge edge having a plurality of discharge apertures formed in the lower portion of the edge, a plastic handle connected to the hopper for manipulating the hopper, said plastic handle having an elongated hollow shaft and a plastic gripper portion adapted to be held by an operator, an elongated plastic gate selectively positionable adjacent to the discharge apertures at the bottom of the hopper controlling the rate of discharge of material from the hopper through the discharge apertures, a gate support mounted on the hopper and supporting the gate, a control apparatus mounted on the handle adjacent to the gripper portion, said control apparatus including; an injection molded housing, an injection molded plastic latch pivotally mounted in the housing, an injection molded plastic dog releasably engageable with the latch, a wheel rotatably connected to the dog, a connector having one end secured to the gate and the other end threadedly connected to the wheel for positioning the connector relative to the dog, an activator grip formed integral with the dog and being positionable adjacent to the gripper portion, an injection molded plastic release pivotally mounted in the handle and being connected to the latch, a molded plastic indicator fixed to the connector, and a molded plastic scale movably mounted on the housing and cooperative with the indicator to indicate the position of the gate relative to the discharge apparatus, a pivotal support leg connected to the handle, a rod connecting the pivotal support leg with the latch, whereby positioning of the fertilizer spreader in an attitude in which the support leg lends support to the hopper releases the latch from the dog to position the gate in a position interrupting the flow of material through the discharge apertures, a plastic agitator axle having a portion rotatably mounted in the hopper, an axle support in the hopper supporting the axle, and a plastic wheel mounted on each of the ends of the axle, said agitator axle having a male and female portion mateably connected for rotating with one of the wheels.

25. A fertilizer spreader comprising; an injection molded hopper for holding granular material, said hopper having a plurality of flat panels formed integral with each other having an open top, said panels sloping inward toward the bottom of the hopper, said open top having a reduced pouring edge portion formed by edges of panels to facilitate pouring material out of the hopper through the top, said hopper having a discharge aperture adjacent to the bottom thereof, an injection molded plastic frame supportingly connected to the hopper, a plastic handle connected to the frame for manipulating the frame and the hopper, said plastic handle having a plastic elongated hollow shaft and a plastic gripper portion adapted to be held by an operator, an injection molded plastic gate selectively positionable adjacent to the discharge aperture of the hopper controlling the rate of discharge of material from the hopper through the discharge aperture, a control apparatus mounted on the handle adjacent to the gripper portion, said control appartus including; an injection molded plastic housing, an injection molded plastic latch pivotally mounted in the housing, an injection molded plastic dog releasably engageable with the latch, a wheel rotatably connected to the dog, a connector having one end secured to the gate and the other end threadedly connected to the wheel for positioning the connector relative to the dog, an activator grip formed integral with the dog and being positionable adjacent to the gripper portion, an injection molded plastic release pivotally mounted in the handle and being connected to the latch, an injection molded plastic indicator fixed to the connector, and an injection molded plastic scale movably mounted in the housing and cooperative with the indicator to indicate the position of the gate relative to the discharge aperture, a plastic pivotal support leg connected to the frame, a rod connecting the pivotal support leg with the latch whereby positioning of the fertilizer spreader in an attitude in which the support leg lends support to the hopper releases the latch from the dog to position the gate in a position interrupting the flow of material through the discharge aperture, an elongated plastic axle rotatably mounted on the frame, a pair of injection molded plastic wheels mounted on opposite ends of said axle, one of said wheels being fixed to the axle to rotate the axle with the wheel, an injection molded plastic bevel gear secured to the axle, an injection molded plastic bevel pinion meshing with the bevel gear, a plastic elongated broadcast shaft having one end fixed to the bevel pinion, said broadcast shaft having its axis of rotation substantially perpendicular to the axis of the axle, said broadcast shaft having a portion of the other end rotatably positioned in the hopper, a plastic agitator connected to the other end of the shaft in the hopper for rotation with the broadcast shaft, and an injection molded plastic propeller secured to the broadcast shaft below the hopper, said plastic propeller having a portion below the discharge aperture of the hopper for receiving granular material from the hopper and spreading the material as the propeller rotates with the broadcast shaft in response to rotation of the wheel fixed to the axle.

26. A fertilizer spreader comprising; an injection molded hopper for holding granular material, said hopper having a plurality of flat panels formed integral with each other, said panels defining an open top, said panels sloping inward toward the bottom, said open top having a reduced pouring edge portion formed by edges of panels to facilitate pouring granular material out of the hopper through the top, said hopper having an elongated discharge edge at its lower portion, said discharge edge having a pluality of discharge apertures formed in the lower portion of the edge, a plastic handle connected to the hopper for manipulating the hopper, said plastic handle having an extruded hollow elongated upper end, said handle having an extruded plastic elongated hollow lower end, an annular joint releasably connecting the lower end of the upper end to the upper portion of the lower end, said joint having a tubular sleeve telescopically mounted in the lower portion of the upper end of the handle, said joint having a second tubular sleeve telescopically mounted in the upper portion of the lower end of the handle, handle fastening means releasably securing the upper end of the handle to the first mentioned tubular sleeve and the lower end of the handle to the second tubular sleeve, a plastic gripper portion fixed to the upper portion of the upper end of the handle and being adapted to be held by an operator, an elongated plastic gate selectively positionable adjacent to the discharge aperture at the bottom of the hopper controlling the rate of discharge of the material from the hopper through the discharge aperture, a gate support mounted on the hopper and supporting the gate, a control apparatus mounted on the upper end of the handle adjacent to the gripper portion, said control apparatus including; an injection molded housing, an injection molded plastic latch pivotally mounted in the housing, an injection molded plastic dog releasably engageable with the latch, a wheel rotatably connected to the dog, a connector having one end secured to the gate and the other end threadedly connected to the wheel for positioning the connector relative to the dog, said gate having an ear formed integral therewith with an opening in the ear and a locking post formed integral with the gate and spaced from the ear receiving a portion of the connector in the opening in the ear and a portion of the connector between the ear and the locking post to secure the connector to the gate, said connector being movably mounted in the handle extending through the joint, an activator grip formed integral with the dog and being positionable adjacent to the gripper portion, an injection molded plastic release pivotally mounted in the handle and being connected to the latch, a molded plastic indicator fixed to the connector, and a molded plastic scale movably mounted on the housing and cooperative with the indicator to indicate the position of the gate relative to the discharge aperture, a pivotal support leg connected to the handle, a rod connecting the pivotal support leg with the latch, said rod being movably positioned in the handle, whereby positioning of the fertilizer spreader in an attitude in which the support leg lends support to the hopper releases the latch from the dog to position the gate in a position interrupting the flow of material through the discharge apertures, a plastic agitator axle having a portion rotatably mounted in the hopper, an axle support in the hopper supporting the axle, and a plastic wheel mounted on each of the ends of the axle, said agitator axle having a male and female portion mateably connected for rotating with one of said wheels.

27. A fertilizer spreader comprising; an injection molded hopper for holding granular material, said hopper having a plurality of flat panels formed integral with each other, said panels defining an open top, said panels sloping downward toward the bottom of the hopper, said open top having a reduced pouring edge portion formed by edges of panels to faciliate pouring material out of the hopper through the top, said hopper having a discharge aperture adjacent to the bottom thereof, an injection molded plastic frame supportingly connected to the hopper, a plastic handle connected to the frame for manipulating the frame and the hopper, said plastic handle having an extruded elongated hollow upper end, said plastic handle having an extruded elongated hollow lower end, a joint connecting the upper end to the lower end, said joint having an annular ring collar, a first tubular sleeve formed integral with the ring collar and being telescopically mounted in the lower portion of the upper end of the handle, a second tubular sleeve formed integral with the ring collar and being telescopically mounted in the upper portion of the lower end, fastening means releasably securing the first tubular sleeve to the upper end and the second tubular sleeve to the lower end, a plastic gripper portion mounted on the upper portion of the upper end and being adapted to be held by an operator, an injection molded plastic gate valve selectively positionable adjacent to the discharge aperture of the hopper controlling the rate of discharge of material from the hopper through the discharge aperture, a control apparatus mounted on the upper portion of the upper end adjacent to the gripper portion, said control apparatus including; an injection molded plastic housing, an injection molded plastic latch pivotally mounted in the housing, an injection molded plastic dog releasably engageable with the latch, a wheel rotatably connected to the dog, a connector having one end secured to the gate and the other end threadedly connected to the wheel for positioning the connector relative to the dog, said gate having an integral ear formed therewith with an opening in the ear and an integral locking post formed therewith spaced from the ear receiving a portion of the connector between the locking post and the ear and having a portion of the connector in the opening to secure the connector to the gate, said connector being movably positioned in the elongated hollow handle, an activator grip formed integral with the dog and being positionable adjacent to the gripper portion, an injection molded plastic release pivotally mounted in the handle and being connected to the latch, an injection molded plastic indicator fixed to the connector, and an injection molded plastic scale mounted on the housing and cooperative with the indicator to indicate the position of the gate relative to the discharge aperture, a plastic pivotal support leg connected to the frame, a rod connecting the pivotal support leg with the latch, said leg having an aperture and a leg locking post formed integral with the leg and being spaced from the aperture receiving a portion of the rod in the aperture and the leg locking post holding the rod in position, whereby positioning of the fertilizer spreader in an attitude in which the support leg lends support to the hopper releases the latch from the dog to position the gate in a position interrupting the flow of material through the discharge aperture, an elongated plastic axle rotatably mounted on the frame, a pair of injection molded plastic wheels mounted on opposite ends of said axle, one of said wheels being fixed to the axle to rotate the axle with the wheel, an injection molded plastic bevel gear secured to the axle, an injection molded plastic bevel pinion meshing with the bevel gear, a plastic elongated broadcast shaft having one end fixed to the bevel pinion, said broadcast shaft having its axis of rotation substantially perpendicular to the axis of the axle, said broadcast shaft having a portion of the other end rotatably positioned in the hopper, a plastic agitator connector to the other end of the shaft in the hopper for rotation with the broadcast shaft, and an injection molded plastic propeller having a portion below the discharge aperture of the hopper for receiving granular material from the hopper and spreading the material as the propeller rotates with the broadcast shaft in response to rotation of the wheel fixed to the axle.

* * * * *